June 9, 1931.  W. J. BESLER  1,809,328
BRAKE MECHANISM FOR MOTOR VEHICLES
Filed Oct. 4, 1927
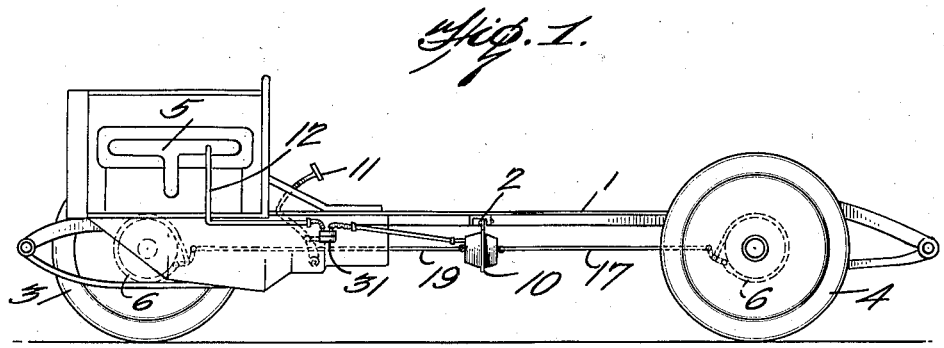
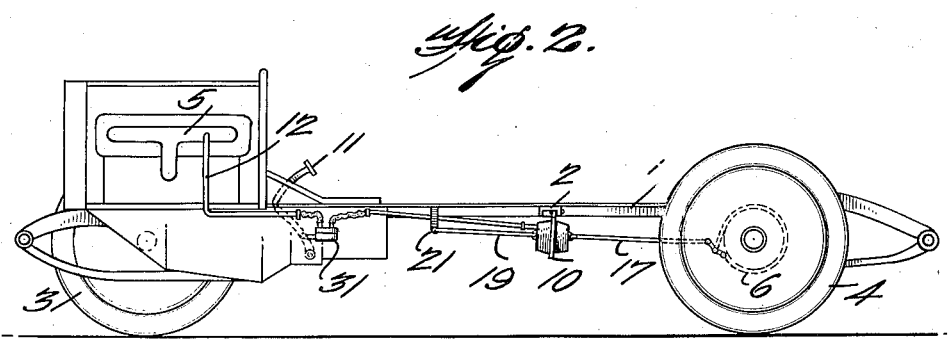
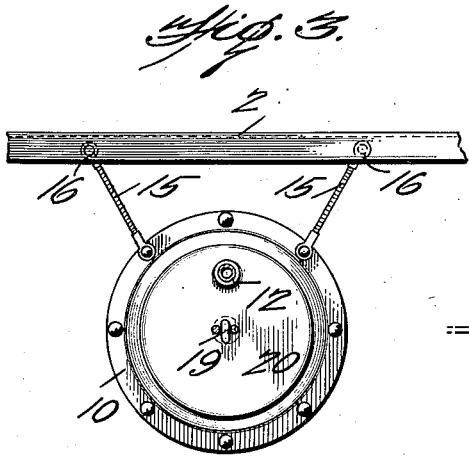
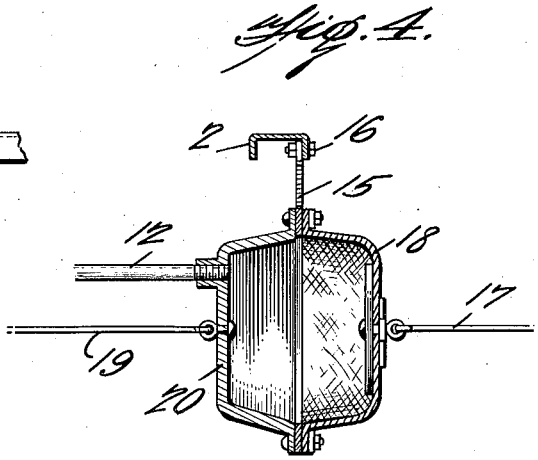
INVENTOR.
William J. Besler,
BY
ATTORNEY.

Patented June 9, 1931

1,809,328

UNITED STATES PATENT OFFICE

WILLIAM J. BESLER, OF PLAINFIELD, NEW JERSEY

BRAKE MECHANISM FOR MOTOR VEHICLES

Application filed October 4, 1927. Serial No. 223,967.

My invention relates to brake mechanism for motor vehicles and more particularly to brake mechanism of the fluid-pressure operated or servo-motor type and to the construction and arrangement of the fluid-pressure motor.

In ordinary brake mechanisms for motor vehicles and the like embodying a fluid-pressure motor of the piston or flexible diaphragm type, it is customary to secure the motor rigidly to the frame or chassis. A bracket shaped to fit the vehicle frame and bolted thereto is usually employed.

In spite of the use of substantial brackets and supporting members, which are heavy and difficult to install, the stresses imposed thereon by the application of the brakes are so large and so often repeated that it is usually difficult to provide a suitable construction which will stand up under service conditions for long periods of time. Furthermore, the bracket or supporting means must be especially designed to fit the requirements of a particular installation. Each different type of vehicle requires a different support or bracket, which increases the expense, and many of the present vehicles, equipped with ordinary brakes, cannot be equipped with servo-motor brakes because of the practical difficulty of mounting or supporting the fluid-pressure motor in a suitable position.

It is the object of my invention to obviate these difficulties by providing a simplified mounting and arrangement of the brake motor such that it may be readily applied to any vehicle without substantial alteration although capable of withstanding the rough usage to which such devices are subjected for long periods of time.

In accordance with my invention, the fluid-pressure motor is suspended from the chassis or frame of the vehicle by one or more flexible members which function merely to support the weight of the motor while it is inoperative. The flexible members may be short chains, woven or stranded wire cables or the like, which are fastened to the casing of the fluid-pressure motor and may be bolted or otherwise secured to any suitable portion of the vehicle chassis capable of supporting the relatively small weight of the motor. The diaphragm or piston of the motor is connected to the brake elements of the rear wheels, for example, in the usual manner. The reaction of the brake-applying force is taken up by a tension rod or cable extending in the opposite direction from the piston rod. In the case of four-wheel brakes, the reaction rod or cable may be secured to the front-wheel brakes, but if the vehicle is not equipped with front-wheel brakes, the rod or cable is secured to the vehicle chassis.

The described mounting of the brake motor is such as to permit movement thereof in a substantially horizontal plane. It is evident that in the case of four-wheel brakes, the forces applies to the front and rear-wheel brakes, respectively, will be similar and no equalizing devices are required. The ratio of actual force applied to the front and rear wheels can easily be altered by changing the leverage of the brake arms on the brake shafts. In any case, the brake-applying forces exerted by the motor are balanced at all times and there is no tendency to wrench or twist the motor loose, as where it is rigidly secured to the frame of the vehicle; and when the motor is operative it tends to align itself along the straight line between its forward and rear points of attachment to the brake rigging and is supported thereby. In addition, the mounting is simpler than a rigid bracket and may be applied without substantial alteration to all types and makes of vehicles.

Other objects and advantages of my invention will appear from the following detailed description of the preferred embodiment thereof shown in the accompanying drawings, in which Fig. 1 is a side elevational view of a vehicle chassis equipped with four-wheel brakes and with brake mechanism embodying my invention;

Fig. 2 is a similar view illustrating the application of the invention to a vehicle equipped with rear-wheel brakes only; and Figs. 3 and 4 are detail views of the mounting and arrangement of one form of brake motor as shown in Figs. 1 and 2.

Referring to Fig. 1, I have shown a conventional vehicle chassis comprising a frame 1 including longitudinal and transverse frame members, one of the latter being indicated at 2, front and rear wheels 3 and 4, respectively, and an internal-combustion engine 5. In the modification shown, friction brake elements 6 of the usual type are provided in connection with both the front and the rear wheels. The vehicle chassis and brakes are shown conventionally, as the detailed construction forms no part of my present invention.

The brake elements 6 are arranged to be actuated by a fluid-pressure motor 10, the detailed construction of which is shown in Figs. 3 and 4, under the control of a brake pedal 11. A convenient source of energy for the brake motor of a vehicle of the class shown is the intake manifold of the internal-combustion engine 5. As indicated, a pipe connection 12 is arranged between the intake manifold and the brake motor 10, this connection including a control valve 31 operatively associated with the brake pedal 11 to energize and release the brake motor in accordance with the depression and release of the pedal in the usual manner.

The fluid-pressure motors ordinarily employed in mechanisms of this character are of the flexible diaphragm type as shown, although any suitable type of motor may be utilized. In the motor illustrated, when the control valve 31 is so adjusted by the brake pedal that the motor is connected to the intake manifold of the engine, a partial vacuum is created within the motor and the brakes are applied as will be described more fully hereinafter. Conversely, when the brake pedal is released, air is admitted to the brake motor and the brakes are released.

As shown more clearly in Figs. 3 and 4, the fluid-pressure motor 10 is suspended from the transverse frame member 2 by two flexible supporting members 15 connected to the casing of the motor and bolted or otherwise secured to the member 2 as indicated at 16. As will be noted in the drawing, the supporting members are secured to the motor at transversely spaced points and to more widely spaced points on a cross member of the chassis. The supporting members, by their divergent arrangement, act to stabilize the motor against movements transversely of the chassis. This stabilizing effect relieves flexible member 18 of strain and materially reduces the wearing action at the place of connection between the flexible member 18 and the transmission member 17. Another benefit attained by this arrangement is the proper automatic adjustment of the motor 10 to a position for efficient operation as the position of the chassis varies with road conditions. The supporting members 15 may be flexible wire-rope cable or chains, for example. The supporting members are designed to flexibly support the weight of the motor and to permit movement thereof in a substantially horizontal plane; they are of such character that they may be readily secured to almost any part of the chassis frame or even the wooden floor boards of the vehicle as may be necessary in order to position the motor in the desired relation to the brake elements.

It will be evident that the described support differs from the usual rigid support in that there is no provision for taking up the reaction to the brake-applying force. In fact, the flexibility of the support prevents any tendency for the motor, in operation, to twist or loosen the supports as in the case of a rigid support. It is also evident that it is an easy matter to install this motor with a support of this kind.

The brake-applying forces are arranged to be balanced in such a manner that no substantial movement of the motor with respect to the chassis is produced; but any movement that does occur is not impeded by reason of the flexibility of the support so that the support is not weakened by such movement even after long usage.

In the embodiment shown, the rear-wheel brakes are applied by force transmitted from the motor 10 through a tension member 17 connected to a flexible diaphragm 18 of the motor. The reaction of the brake-applying force exerted through the member 17 is taken up by an oppositely extending member 19 which is connected, as indicated in Fig. 1, to the front-wheel brakes. The member 19, which like the member 17 may be a metal rod or cable, is secured to the casing 20 of the fluid-pressure motor.

It will be apparent that equal forces will be applied to the front and rear-wheel brake elements and no equalizing device is therefore required. The ratio of rear-wheel to front-wheel application can easily be altered by changing the leverage of the brake arms on the brake shafts. If the vehicle is not provided with front-wheel brakes, the tension member 19 is secured at its forward end to the chassis frame, as indicated at 21 (see Fig. 2), or to any fixed structural member substantially in line with the motor and rear brake element. Although substantial alinement is desired, the motor actually lies normally more or less below and to one side of the line between the ends of the rods or cables 17 and 19. When the motor is energized, however, it is supported by the tensioned rod and moves into alinement, such transverse movement being permitted by the flexibility of the supporting members 15.

As I have indicated, various changes in the construction and arrangement shown may be made without departing from the scope of my invention.

I claim:

A motor vehicle comprising a chassis having a cross frame member and friction brake elements cooperating with the wheels thereof, a brake operating mechanism including a fluid pressure motor connected to the brake elements by a longitudinally extending transmission member through which the operating force is applied and means for flexibly suspending the motor from the chassis, said means comprising two flexible cable members secured to the motor at transversely spaced points and to more widely spaced points on the cross member of the chassis, the said flexible members by their divergence acting to stabilize the motor against movements transversely of the chassis.

WILLIAM J. BESLER.